United States Patent [19]
Fukui

[11] Patent Number: 5,795,634
[45] Date of Patent: Aug. 18, 1998

[54] HEAT INSULATING NOISE REDUCING DUCT

[75] Inventor: Kouki Fukui, Osaka, Japan

[73] Assignee: Totaku Industries, Inc., Osaka, Japan

[21] Appl. No.: 714,586

[22] Filed: Sep. 16, 1996

[30] Foreign Application Priority Data

Sep. 22, 1995 [JP] Japan .................... 7-269506

[51] Int. Cl.$^6$ .................... F16L 59/14; F16L 55/02; B32B 5/28; C04R 43/12
[52] U.S. Cl. .................... 428/36.1; 428/36.5; 428/36.91; 138/122; 138/129; 138/137; 138/149; 138/150; 138/154
[58] Field of Search .................... 428/36.1, 36.5, 428/36.91; 138/122, 129, 137, 149, 150, 154

[56] References Cited

U.S. PATENT DOCUMENTS

| | | | |
|---|---|---|---|
| 3,885,593 | 5/1975 | Koerber et al. | 138/128 |
| 4,239,064 | 12/1980 | Gilman | 138/154 |
| 4,590,108 | 5/1986 | Nippe | 428/36 |
| 4,615,411 | 10/1986 | Breitscheidel et al. | 181/224 |
| 5,607,529 | 3/1997 | Admczyk et al. | 156/143 |

FOREIGN PATENT DOCUMENTS

| | | |
|---|---|---|
| 0262092 A1 | 3/1988 | European Pat. Off. |
| 2639470 A1 | 3/1978 | Germany |

OTHER PUBLICATIONS

Singapore Search Report dated Dec. 5, 1997.

*Primary Examiner*—Kathleen Choi
*Attorney, Agent, or Firm*—Whitham Curtis & Whitham

[57] ABSTRACT

A heat insulating noise reducing duct includes: an internal layer formed by helically winding a flat fibrous band and integrally bonding outer circumferential faces of adjacent joint parts of the band by resin reinforcing bands to thereby form a substantially smooth cylindrical shape; one or more resin linear bodies helically wound between these adjoining resin reinforcing bands and bonded to the fibrous band; an open-cell foam layer formed by helically winding an open-cell foam resin band onto an outer circumferential face of the inner layer while making its paired side edges abut each other; an intermediate sheet layer formed by helically winding a thin resin sheet-like band onto an outer circumferential face of the open-cell foam band while partially overlapping the resin sheet-like band, and by integrally bonding the overlapped parts; a closed-cell foam layer formed by helically winding a closed-cell foam resin band onto an outer circumferential face of the sheet layer while making its paired side edges abut each other; and an external layer formed by helically winding a thin resin sheet-like band onto an outer circumferential face of the closed-cell foam layer while partially overlapping the resin sheet-like band and by integrally bonding the overlapped parts. The fibrous band, the resin reinforcing band, the resin linear body, the open-cell foam resin band, the resin band forming the intermediate sheet layer, the closed-cell foam resin band, and the resin band forming the external layer are wound at an identical helical pitch.

5 Claims, 3 Drawing Sheets

HEAT INSULATING NOISE REDUCING DUCT

BACKGROUND OF THE INVENTION

The present invention relates to a duct for gas transfer. In particular, it relates to a heat insulating duct suitable for the transfer of air such as hot air and cold air for heating and cooling at temperatures different from room temperature.

Such a conventional heat insulating duct for gas transfer is generally formed by helical winding a heat insulating foam material around the outer circumferential part of a duct body, with the duct body forming the internal face of the duct.

In the conventional duct having such a configuration where the duct body constitutes the inner circumferential face of the duct, the duct acts as a guide tube for noise created by an air blowing source such as an air blower, so that this noise is emitted from an opening part of the duct together with the transported air so as to cause discomfort to people. Since this noise is continuously generated during use of the duct, that is, during air blowing, there is a problem that it negatively affects the nerves of people.

SUMMARY OF THE INVENTION

Thus, the present invention has an object to solve the problem of the conventional air blower duct by extinguishing the unpleasant noise emitted from such a duct or by greatly reducing the noise as much as possible even if the noise cannot be completely extinguished, and, particularly from the manufacturing standpoint has, an object to provide a duct with a configuration which is suited to continuous production, which can be inexpensively mass produced, and which does not require new equipment.

The heat insulating noise reducing duct of the present invention comprises: an internal layer formed by helically winding a flat fibrous band and integrally bonding outer circumferential faces of adjacent joint parts of the band by a resin reinforcing band to thereby form a substantially smooth cylindrical shape; one or more resin linear bodies helically wound next to the resin reinforcing band and bonded to the fibrous band; an open-cell foam layer formed by helical winding an open-cell foam resin band onto an outer circumferential face of the inner layer while making its paired side edges abut each other; an intermediate sheet layer formed by helically winding a thin resin sheet-like band onto an outer circumferential face of the open-cell foam band while partially overlapping the resin sheet-like band, and by integrally bonding its overlapped parts; a closed-cell foam layer formed by helically winding a closed-cell foam resin band onto an outer circumferential face of the intermediate sheet layer while making its paired side edges abut each other; and an external layer formed by helically winding a thin resin sheet-like band onto an outer circumferential face of the closed-cell foam layer while partially overlapping the resin sheet-like band and by integrally bonding its overlapped parts; wherein the fibrous band, the resin reinforcing band, the resin linear body, the open-cell foam resin band, the resin band forming the intermediate sheet layer, the closed-cell foam resin band, and the resin band forming the external layer are wound at an identical helical pitch.

With such a structure, in the heat insulating noise reducing duct of the present invention, the air permeable fibrous internal layer and the open-cell foam layer are formed on the inner side of the intermediate sheet layer so as to absorb the generated unpleasant noise during transportation of the air. The closed-cell foam layer and the external layer are also formed on the outer circumferential face of the intermediate sheet layer to prevent changes in the temperature of the air flowing in the duct. Moreover, the joint parts of the fibrous band are joined via the resin reinforcing bands on the rear side of the fibrous band to maximize the area of the fibrous band which faces the interior of the duct.

To carry out the invention, air permeable nonwoven fabric, woven fabric, or braided fabric may be used as the fibrous band. Further, the invention may be carried out with such a structure that the abutting parts of the open-cell foam band are placed so as to be positioned on the outer circumferential face of the resin reinforcing band which joins the fibrous band; and the open-cell foam band 2 is positioned on the entire rear side of the air permeable face of the fibrous band to prevent any reduction in noise absorption performance. Additionally also the closed-cell foam layer is formed of a plurality of layers by using a plurality of closed-cell foam resin bands so as to be made flexible. Further the abutting parts of the paired edges of each band which form each of these layers are displaced in the axial direction of the duct so that these abutting parts are not continuous in the direction of thickness of the duct, whereby preventing any reduction in the heat insulating effect.

DETAILED DESCRIPTION OF THE INVENTION

Preferred embodiments of the present invention will be described below with reference to the drawings.

Figure 1:
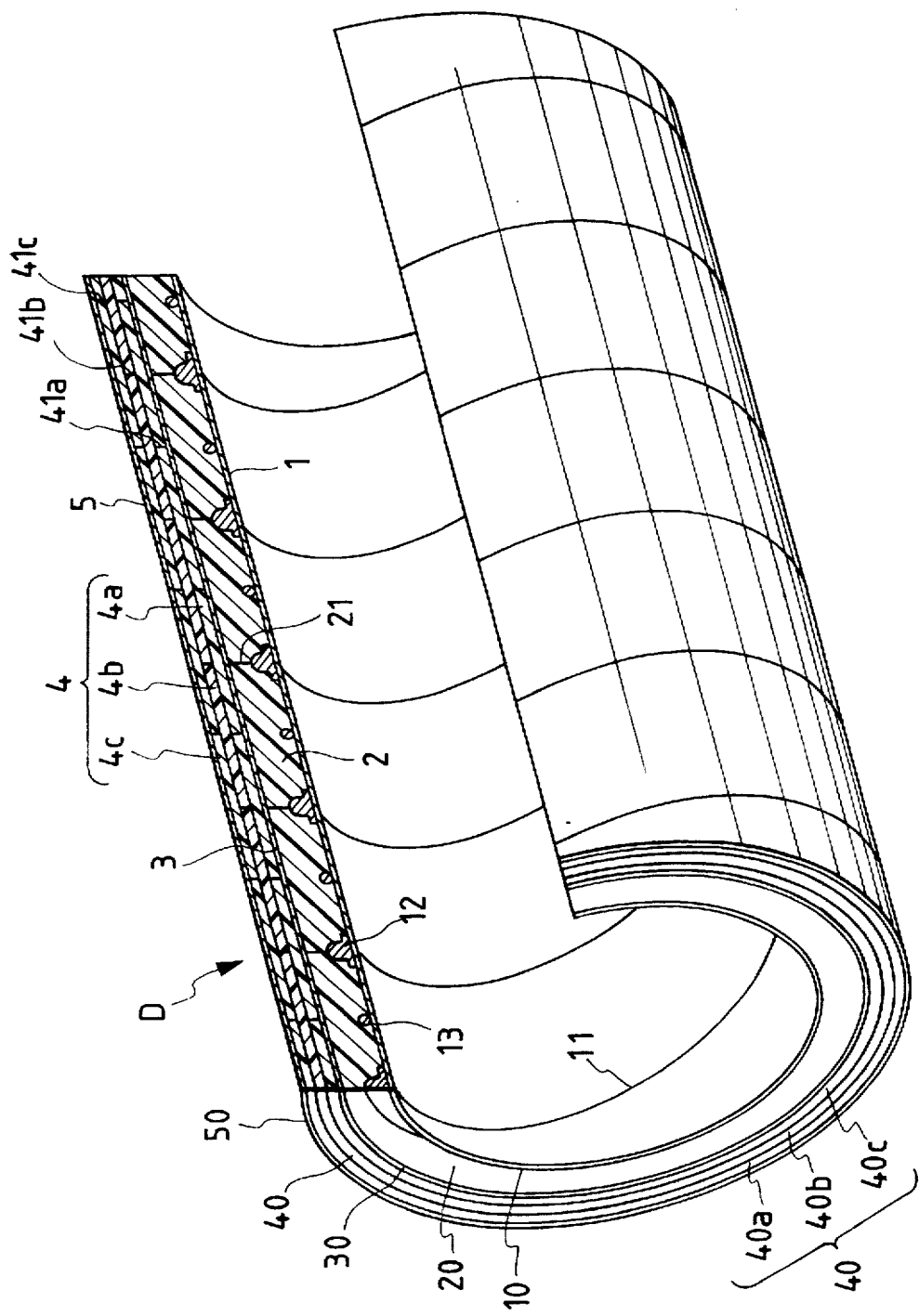
FIG. 1 is a partial sectional perspective view in which a middle part of duct of a first embodiment of the present invention is cut.
Figure 2:
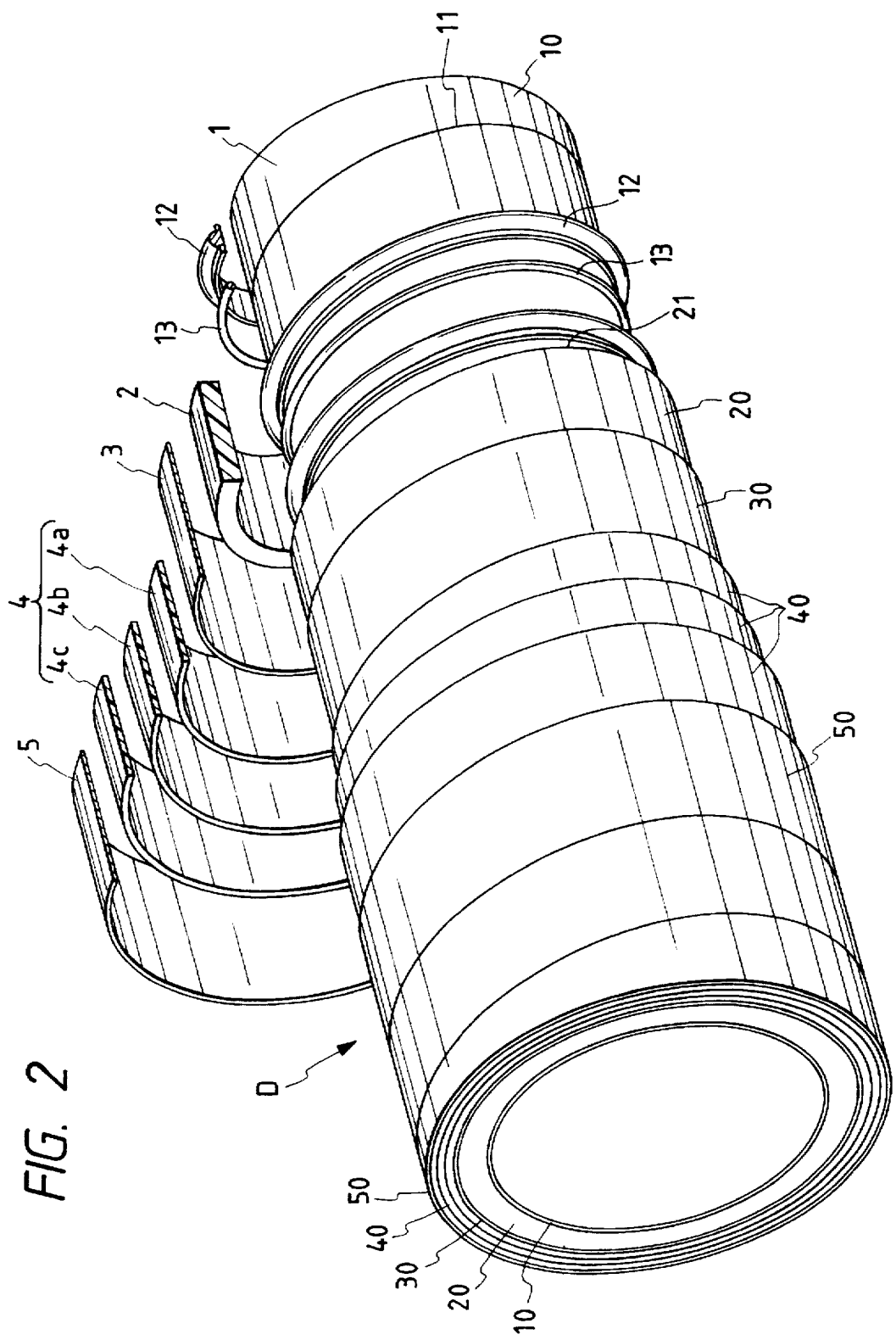
FIG. 2 is a perspective view showing elements of the duct shown in FIG. 1 in a partially exploded state.

FIG. 1 and FIG. 2 are views which show a first embodiment of the present invention. FIG. 1 is a view showing a sectional form with a part cut out, and FIG. 2 is a view showing a part of each constituent element in exploded form.

As the material for a fibrous band 1 constituting a duct D shown in the drawing, for example, nonwoven fabric which is formed by laminating continuous long fibers of polypropylene (PP) and bonding them by thermal embossing is used. This unwoven fabric possesses properties such as superior tensile balance both lengthwise and crosswise, combined with flexibility; no fraying from cut surfaces, no fuzzing of the surface, and little thermal contraction; and it is not spoiled by insects, mold, bacteria, or the like. PP is used as the material for a resin reinforcing band 12 and a resin linear body 13.

As the material for an open-cell foam resin band 2, for example, urethane which is foamed to have a density of about 22 kg/m$^3$ and a tensile strength of 1.7 kg/cm$^2$ is used. As the material for a closed-cell foam resin band 4, for example, PE which is foamed to have a density of about 25 kg/m$^3$ and a tensile strength of 1.7 kg/cm$^2$ is used. As the resin material for sheet-like bands 3 and 5 forming an intermediate layer 30 and an external layer 50, polyvinyl chloride (PVC) which exhibits excellent fusion properties is used.

The duct D shown in FIG. 1 and FIG. 2 is made to have a helical pitch of, for example, 22 mm. A fibrous band 1 of the aforementioned unwoven fabric with a width of 22 mm and a thickness of 0.5 mm is helically wound around the outer circumference of a mandrel not illustrated used to form the duct while making its paired side edges contact one another. The resin reinforcing band 12 made of PP with a reverse T-shape and with a width of 6 mm and a height of 3 mm is helically wound onto the joint parts 11 of these paired side edges in a semi-molten state immediately after extrusion from an extruder, and both of these are fused and integrated to form an internal layer 10 whose interior has a smooth cylindrical shape. Simultaneously, one linear body 13 made of PP with a diameter of 1 mm is similarly helically wound onto an intermediate part of these two adjacent resin reinforcing bands 12, 12 in a semi-molten state immediately after extrusion from the extruder, and is fused with the fibrous band 1. In this way, the looseness of the fibrous band 1 is reduced, and a substantially rectilinear cylindrical shape is maintained.

Next, the open-cell foam resin band 2 made of urethane with a width of 22 mm and a thickness of 6 mm is helically wound onto the outer circumferential face of the internal layer 10 so that its paired side edges abut each other and abutting parts 21 are positioned on the resin reinforcing band 12, thereby forming an open-cell foam layer 20 on the internal layer 10. Next, the sheet-like band 3 made of PVC with a width of 28 mm and a thickness of 0.3 mm is helically wound onto the outer circumferential face of the open-cell foam layer 20 while overlapping approximately 6 mm of its side edge parts. The overlapped parts are fused and integrated to form the intermediate sheet layer 30. Furthermore, a closed-cell foam layer 40 is formed by helically winding three sheets 4a, 4b and 4c of the closed-cell foam resin band 4, which is made of PE with a width of 22 mm and a thickness of 2 mm, around the outer circumferential face of the sheet layer 30 while the three sheets are displaced by a half width in its width direction and whose paired side edges are made to abut each other. Furthermore, a sheet-like band 5 made of PVC with a width of 28 mm and a thickness of 0.3 mm identical to the aforementioned sheet-like band 3 is wound around the outer circumferential face of the closed-cell foam layer 40 while overlapping approximately 6 mm of its side edge parts. The overlapped parts are fused and integrated to form the outer layer 50.

In this way, the duct D is formed by winding, at the same helical pitch, the fibrous band 1 of nonwoven fabric and the resin reinforcing band 12 forming the inner layer 10, the resin linear body 13, the foam band 2 forming the open-cell foam layer 20, the sheet-like band 3 forming the intermediate sheet layer 30, the three sheets of foam bands 4a, 4b, 4c forming the closed-cell foam layer 40, and the sheet-like band 5 forming the outer layer 50.

Figure 3:
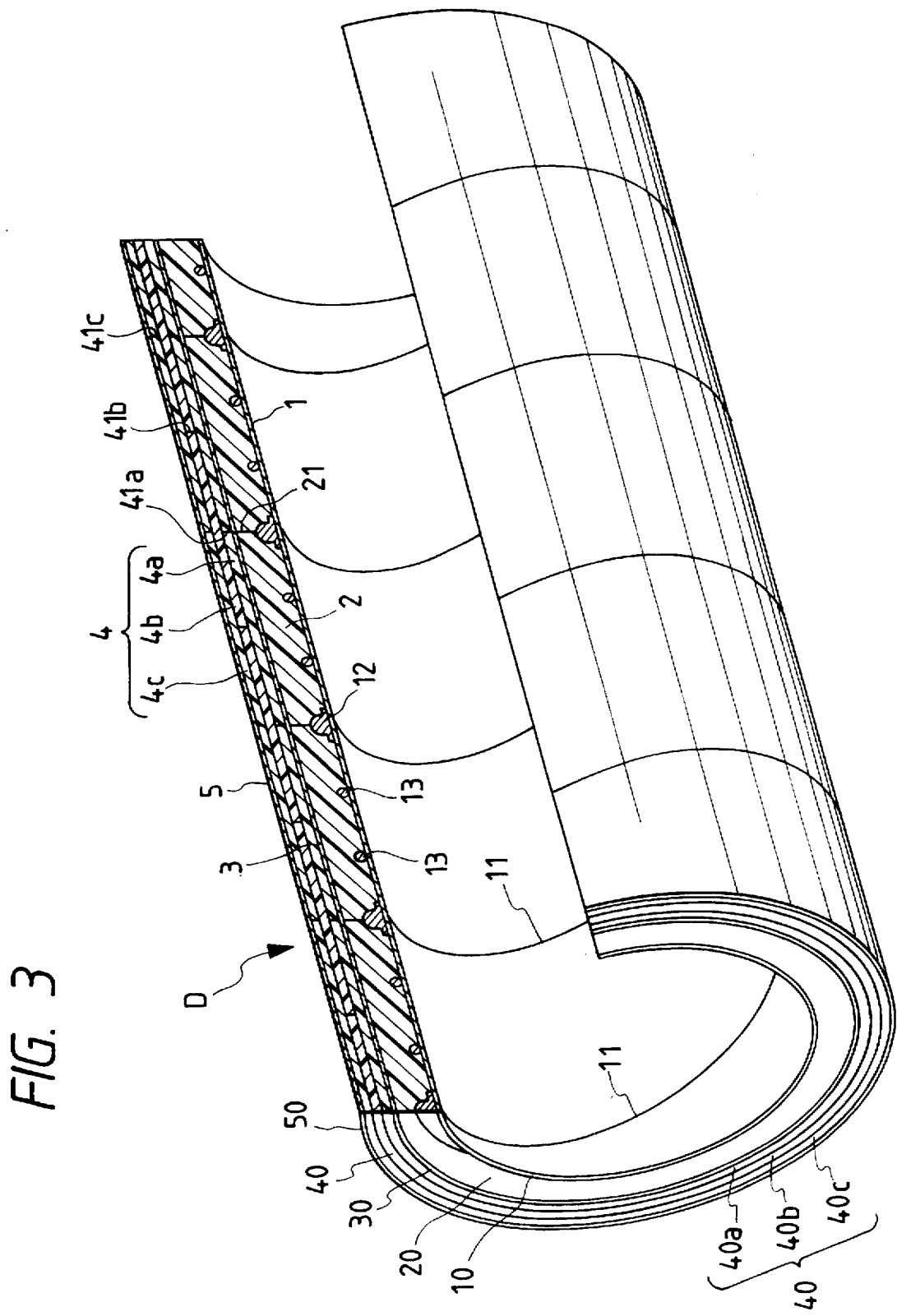
FIG. 3 is a partial sectional perspective view equivalent to FIG. 1, showing a second embodiment of the present invention.

FIG. 3 shows another embodiment. The lateral widths of the fibrous band 1 forming the internal layer 10, the open-cell foam band 2 forming the open-cell foam layer 20, and the three sheets of closed-cell foam resin bands 4a, 4b, 4c forming the closed-cell foam layer 40 are respectively made to be 30 mm. The lateral widths of the sheet-like band 3 forming the intermediate sheet layer 30 and the sheet-like band 5 forming the external layer 50 are respectively made to be 38 mm, and their overlapping widths are made to be 8 mm. Moreover, two resin linear bodies 13 adhering to the rear side of the fibrous band 1 are arranged in two strands so as to maintain the fibrous band 1 in a substantially rectilinear cylindrical shape. Other matters are kept the same as in the first embodiment.

With regard to the respective resin materials forming the duct D of the present invention, it is a matter of course that any synthetic resin materials other than the materials enumerated in the first embodiment may be used. As for the material of the fibrous band 1, it is not limited to fiber of synthetic resin, and natural fiber materials may be used. Moreover, with regard to the adhesion of the fibrous band 1, the reinforcing band 12 and the linear body 13, the adhesion of the sheet-like band 3 forming the intermediate sheet layer 30, and the adhesion of the sheet-like band 5 forming the external layer 50 may be performed by use of adhesive agents in place of fusion by half-molten bands which are extruded from resin extruding devices or by thermal melting of these bands. In the case where these bands are fused, it is preferable to use materials with high mutual fusibility. With regard to the fibrous band 1, as its side edge parts are fused or bonded by the resin reinforcing body 12, it is preferable that the paired side edges contact one another, but it is also acceptable to conduct winding with a certain amount of gap.

Representative embodiments of the present invention have been described above, but the present invention is not necessarily limited to the structure of these embodiment, and the invention may be carried out with appropriate modifications so long as the aforementioned required constituent elements of the present invention are provided, the objects of the present invention are achieved, and the below-mentioned effects are exhibited.

As is clear from the foregoing description, the heat insulating noise reducing duct of the present invention has a configuration in which an intermediate sheet layer is formed between walls constituting the duct, an air permeable fibrous layer and an open-cell foam layer are formed on the inner side, and a closed-cell foam layer and an outer layer are formed on the outer side. Consequently, the noise generated from an air blowing source such as an downwardly air blower is efficiently absorbed by the two layers on the inner side of the duct, while any changes in the temperature of the air flowing through the interior of the duct are prevented by the closed-cell foam layer of the outer side. Furthermore, since the joint parts of the fibrous band are joined by resin reinforcing bodies on the rear side of the fibrous band, the area of the fibrous band facing the interior of the duct is increased to the maximum, enabling the maximum enhancement of the noise absorption effect and simultaneously enabling assurance of the reinforcement and shape retention of the fibrous band.

Moreover, because resin linear bodies are arranged and bonded onto the rear side of the intermediate parts in the width direction of the fibrous band so as to maintain the shape of the fibrous band, the inner surface of the duct has almost no wave-like unevenness and can be given a rectilinear form even though the fibrous band itself has poor shape retention. Consequently, since a wide fibrous band can be used, continuous production of ducts can be carried out easily and efficiently with large pitch widths by simultaneously providing band widths to the other bands. These are remarkable effects of the present invention.

What is claimed is:

1. A heat insulating noise reducing duct, comprising:
   a flat fibrous band helically wound, adjacent side edges of said helically wound fibrous band being brought into contact to form a joint;
   a resin reinforcing band bonded to an outer circumferential face of said joint, an internal layer with a substantially smooth cylindrical shape being formed of said helically wound flat fibrous band integrally bonded with said resin reinforcing band;

at least one resin linear body helically wound next to said resin reinforcing band and bonded to said fibrous band;

an open-cell foam layer formed of a helically wound open-cell foam resin band on an outer circumferential face of said internal layer, side edges of said open-cell foam resin band being abutted to each other;

an intermediate sheet layer formed of a helically wound resin sheet band on an outer circumferential face of said open-cell foam resin band, parts of said sheet band being overlapped with each other and integrally bonded to each other;

a closed-cell foam layer formed of a helically wound closed-cell foam resin band on an outer circumferential face of said intermediate sheet layer, side edges of said closed-cell foam resin band being abutted to each other; and an external layer formed of a helically wound resin sheet band on an outer circumferential face of said closed-cell foam layer, parts of said resin sheet band being overlapped with each other and integrally bonded to each other, wherein said fibrous band, said resin reinforcing band, said resin linear body, said open-cell foam resin band, said resin sheet band forming said intermediate sheet layer, said closed-cell foam resin band, and said resin sheet band forming said external layer are wound at a substantially identical helical pitch.

2. A heat insulating noise reducing duct according to claim 1, wherein said fibrous band comprises one of an air-permeable woven fabric and an air permeable nonwoven fabric.

3. A heat insulating noise reducing duct according to claim 1, wherein abutting parts of said open-cell foam resin band are positioned on an outer circumferential face of said resin reinforcing band.

4. A heat insulating noise reducing duct according to claim 2, wherein abutting parts of said open-cell foam resin band are positioned on an outer circumferential face of said resin reinforcing band.

5. A heat insulating noise reducing duct according to claim 1, wherein said closed-cell foam layer comprises a plurality of layers of closed-cell foam resin bands, and wherein abutting parts of side edges of each of said closed-cell foam resin bands are displaced from each other in an axial direction of said duct.

* * * * *